United States Patent [19]
Li

[11] Patent Number: 5,739,662
[45] Date of Patent: Apr. 14, 1998

[54] LOW COST DRIVE FOR A RELUCTANCE MACHINE HAVING FULLY-PITCHED WINDINGS

[75] Inventor: Yue Li, St. Louis, Mo.

[73] Assignee: Emerson Electric Co., St. Louis, Mo.

[21] Appl. No.: 705,786

[22] Filed: Aug. 30, 1996

[51] Int. Cl.$^6$ .................................................. H02P 9/00
[52] U.S. Cl. ........................... 318/701; 318/439; 310/156
[58] Field of Search ................................... 318/700, 701, 318/254, 439, 138; 310/156, 162

[56] References Cited

U.S. PATENT DOCUMENTS

| | | | |
|---|---|---|---|
| 4,628,245 | 12/1986 | Quayle | 322/32 |
| 4,792,710 | 12/1988 | Williamson | 310/90.5 |
| 5,010,267 | 4/1991 | Lipo et al. | 310/162 |
| 5,545,938 | 8/1996 | Mecrow | 310/156 |

FOREIGN PATENT DOCUMENTS

| | | | |
|---|---|---|---|
| 2 262 843 | 6/1993 | United Kingdom | H02K 3/18 |

OTHER PUBLICATIONS

B.C. Mecrow, "Fully Pitched–Winding Switched–Reluctance and Stepping–Motor Arrangements," Jan. 1993, IEE Proceedings–B.

P.G. Barrass, et al., "Bipolar Operation of Fully–Pitched Winding Switched Reluctance Drives," Sep. 11–13, 1995, IEE Conference Publication No. 412.

P.G. Barrass, et al., "The Unipolar Operation of Fully Pitched Winding Switched Reluctance Drives," 1994, ICEM Conference Proceedings.

B.C. Mecrow, "New Winding Configurations for Doubly Salient Reluctance Machines," Oct., 1992, IEEE Industrial Applications Society.

Stephenson and Blake, "The Characteristics, Design and Applications of Switched Reluctance Motors and Drives," Jun. 1993, Nuremberg, Germany.

Primary Examiner—Brian Sircus
Attorney, Agent, or Firm—Arnold, White & Durkee

[57] ABSTRACT

A reluctance machine system including a reluctance machine having a rotor, a stator and fully-pitched windings and a drive, wherein the drive energizes the phase windings such that continuous uni-polar current is provided to at least one of the phase windings and bi-polar current is applied to other phase windings to provide output torque as a function of the mutual-inductance between the energized phase windings. Also, a method of operating a fully-pitched reluctance machine according to the described energization scheme.

24 Claims, 9 Drawing Sheets

5,739,662

LOW COST DRIVE FOR A RELUCTANCE MACHINE HAVING FULLY-PITCHED WINDINGS

CROSS-REFERENCE TO RELATED APPLICATION

The present application is related to co-pending application Ser. No. 08/593,752, filed Jan. 29, 1996, entitled "Reluctance Machine With Auxiliary Field Excitations", by the same inventor, the disclosure of which is hereby incorporated by reference. Both the present application and the referenced related application are assigned to the same entity.

FIELD OF THE INVENTION

This invention relates to reluctance machine systems and, in particular, to switched reluctance machine systems. More specifically, the present invention relates to an improved drive for use with switched reluctance machines having fully-pitched windings.

BACKGROUND OF THE INVENTION

In general, a reluctance machine is an electric machine in which torque is produced by the tendency of a movable part to move into a position where the inductance of an energized phase winding is maximized. In one type of reluctance machine, circuitry is provided for detecting the position of the movable part (generally referred to as a "rotor") and energizing the phase windings as a function of the rotor's position. These types of machines are generally known as switched reluctance machines. The present invention is applicable to switched reluctance machines.

The general theory of the design and operation of reluctance machines in general, and switched reluctance machines in particular, is known in the art and is discussed, for example, in Stephenson and Blake, "The Characteristics, Design and Applications of Switched Reluctance Motors and Drives", Presented at the PCIM '93 Conference and Exhibition at Nuremberg, Germany, Jun. 21-24, 1993.

Switched reluctance machine designs have been proposed where the phase windings of the machine are fully-pitched. A fully-pitched winding includes winding coils that span M stator poles where M is an integer equal to the number of phase windings. One such fully-pitched design was proposed by B. C. Mecrow in his paper entitled "Fully pitched-winding switched-reluctance and stepping-motor arrangements," 140 IEE Proceedings No. 1 at 64 et seq. (January 1993).

FIG. 1 illustrates a reluctance machine 10 using fully-pitched windings of the type disclosed in the referenced Mecrow paper. In general, the machine includes a six pole stator 12 and a four pole rotor 14. There are three phases windings A, B and C, and each phase winding comprises a single winding coil a, b and c. Because of the fully-pitched nature of the windings of the machine 10 of FIG. 1, virtually all of the torque production occurs as a result from changes in the mutual inductance's between the two windings as the rotor rotates. An idealized expression for the torque output of a fully-pitched reluctance machine is:

$$T = I_A I_B \frac{\partial M_{AB}}{\partial \theta_R} + I_B I_C \frac{\partial M_{BC}}{\partial \theta_R} + I_C I_A \frac{\partial M_{CA}}{\partial \theta_R}$$

where $M_{AB}$ is the mutual inductance between phases A and B, $M_{BC}$ is the mutual inductance between phases B and C, $M_{CA}$ is the mutual inductance between phases C and A, $I_A$, $I_B$ and $I_C$ are the respective phase currents and $\theta_R$ is the angular position of the rotor with respect to the stator.

To take the fullest advantages of a fully pitched machines, such as the machine 10 of FIG. 1, and to provide maximum torque output, the phase windings of the machine are often energized according to a "three-phase" bi-polar energization scheme where bi-polar excitation of all three phase windings occurs at any given rotor position.

FIG. 2A illustrates the current waveforms associated with a typical "three-phase" bi-polar energization scheme used with fully-pitched reluctance machines. As may be noted, the currents in each of the phase windings are bi-polar in that they are, at different times, of different polarities. The bi-polar currents are such that, for any given rotor position, the total torque output is a function of the changes in the mutual-inductances between the various phase windings.

For example, during the interval corresponding to rotor positions 30°–60°, the mutual inductance between phase A and phase B is increasing and the currents in both phase A and B are positive. Thus, this increasing mutual inductance provides a positive contribution to the torque output. Similarly, during that same interval, the mutual inductance between phase C and phase A is decreasing and the current in phase C is of an opposite polarity to the current in phase A. Thus, the change in this mutual inductance during that interval provides a positive torque contribution. Finally, the mutual inductance between phase B and phase C during that interval is unchanging and there is no torque contribution provided from that mutual inductance.

The various torque contributions provided by the energization scheme of FIG. 2A for each of the mutual-inductances and the total torque output for the machine 10 of FIG. 1 so energized are illustrated in FIG. 2B.

Referring to FIG. 2B, for each rotor position there is a positive torque contribution from two of the mutual inductances and no contribution from the third.

Because of the bi-polar nature of the three phase currents in the energization scheme discussed above, the drive used to control the fully-pitched machine 10 according to this scheme must have the capability to establish bi-polar currents in all three phase windings. Typically, such drives require a separate "H-bridge" configuration for each phase winding in which four power switching devices are associated with each phase winding. One example of a standard three-phase H-bridge drive is illustrated in FIG. 3.

Referring to FIG. 3, each phase winding A, B and C is coupled across a DC bus comprising a positive rail 31+ and a negative rail 31– by four power switching devices 32, 33, 34 and 35. By actuating the appropriate devices 32 and 35 for a given phase into a conductive condition positive electric current may be established in that phase winding. By actuating the appropriate devices 33 and 34 into a conductive condition, electric current of a negative polarity may be established in a given phase winding.

While the three-phase H-bridge drive of FIG. 3 allows for the use of "three-phase" energization schemes with the fully-pitched machine 10 of FIG. 1—and thus for the improved performance available from such energization schemes—it requires twelve individual power switching devices. The costs of such a number of power switching devices can be significant in the overall context of a reluctance machine system. As such, while the drive of FIG. 3 can improve the performance of a fully-pitched reluctance machine, it carries a heavy economic penalty.

It is one object of the present invention to provide a drive for a fully-pitched reluctance machine that can provide the benefits of the energization schemes addressed above with-

3 out suffering the economic disadvantage of the H-bride drive of FIG. 3. Additional advantages of the present invention may be obtained from a review of the following disclosure which explains in detail the nature of the present invention.

SUMMARY OF THE INVENTION

In accordance with an exemplary embodiment of the present invention a reluctance machine system is provided that comprises a reluctance machine having a stator defining a plurality of stator poles, a plurality of fully-pitched phase windings wound around the stator poles, and a rotor defining rotor poles. One of the phase windings is energized such that continuous, uni-directional current flows through the phase windings at all rotor positions. The other two phase windings are simultaneously energized such that, for any given rotor position, there is a torque contribution from: (i) the change in the mutual inductances between the other two phase windings and (ii) the mutual inductances between one of the other two windings and the change in the continuously energized winding. Using this approach, the same torque that was traditionally produced by standard three phase bi-polar energization schemes can be produced with only two bi-polar phase currents and one uni-polar phase current. Accordingly the additional hardware required to provide a third phase of bi-polar current—and its attendant costs —can be eliminated.

BRIEF DESCRIPTION OF THE DRAWINGS

Similar reference characters indicate similar parts throughout the several views of the drawings.

DETAILED DESCRIPTION OF THE INVENTION

Figure 1:
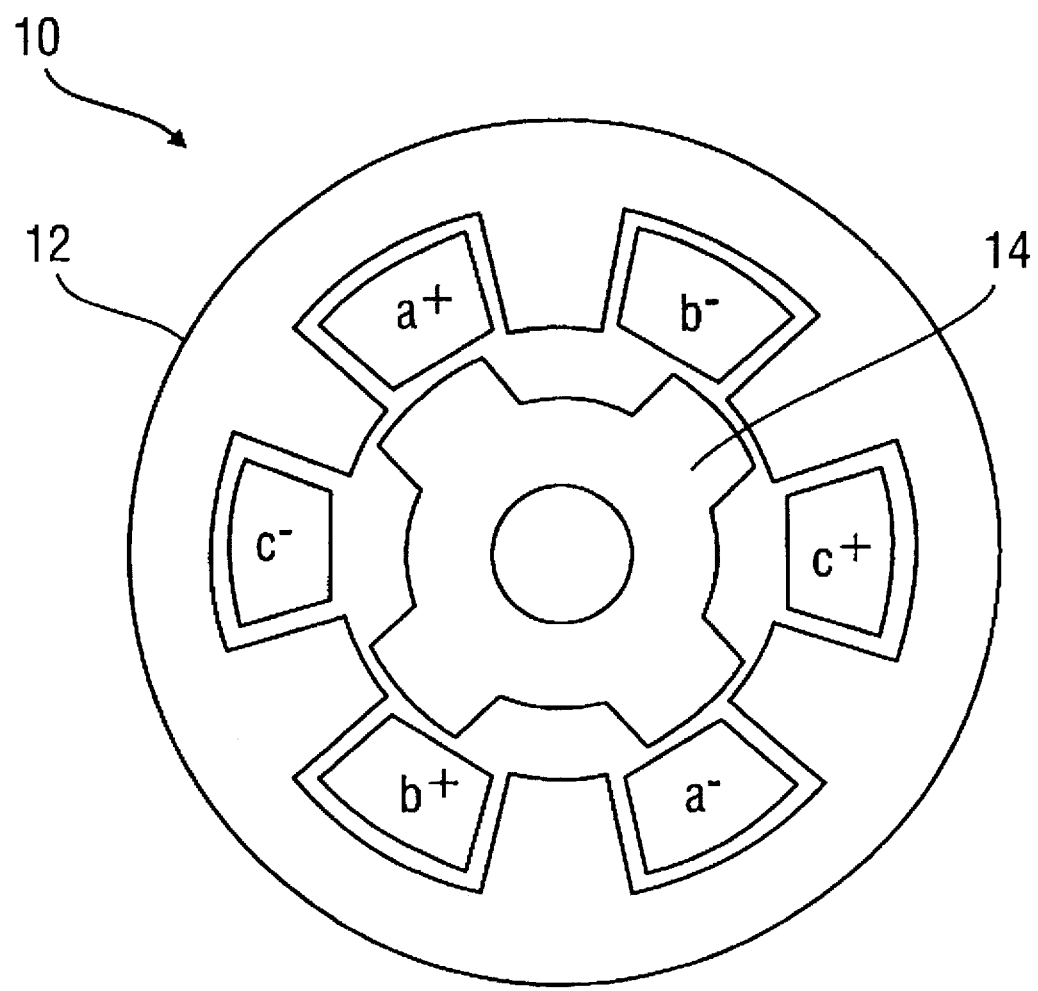
FIG. 1 illustrates a reluctance machine utilizing fully-pitched windings.
Figure 4:
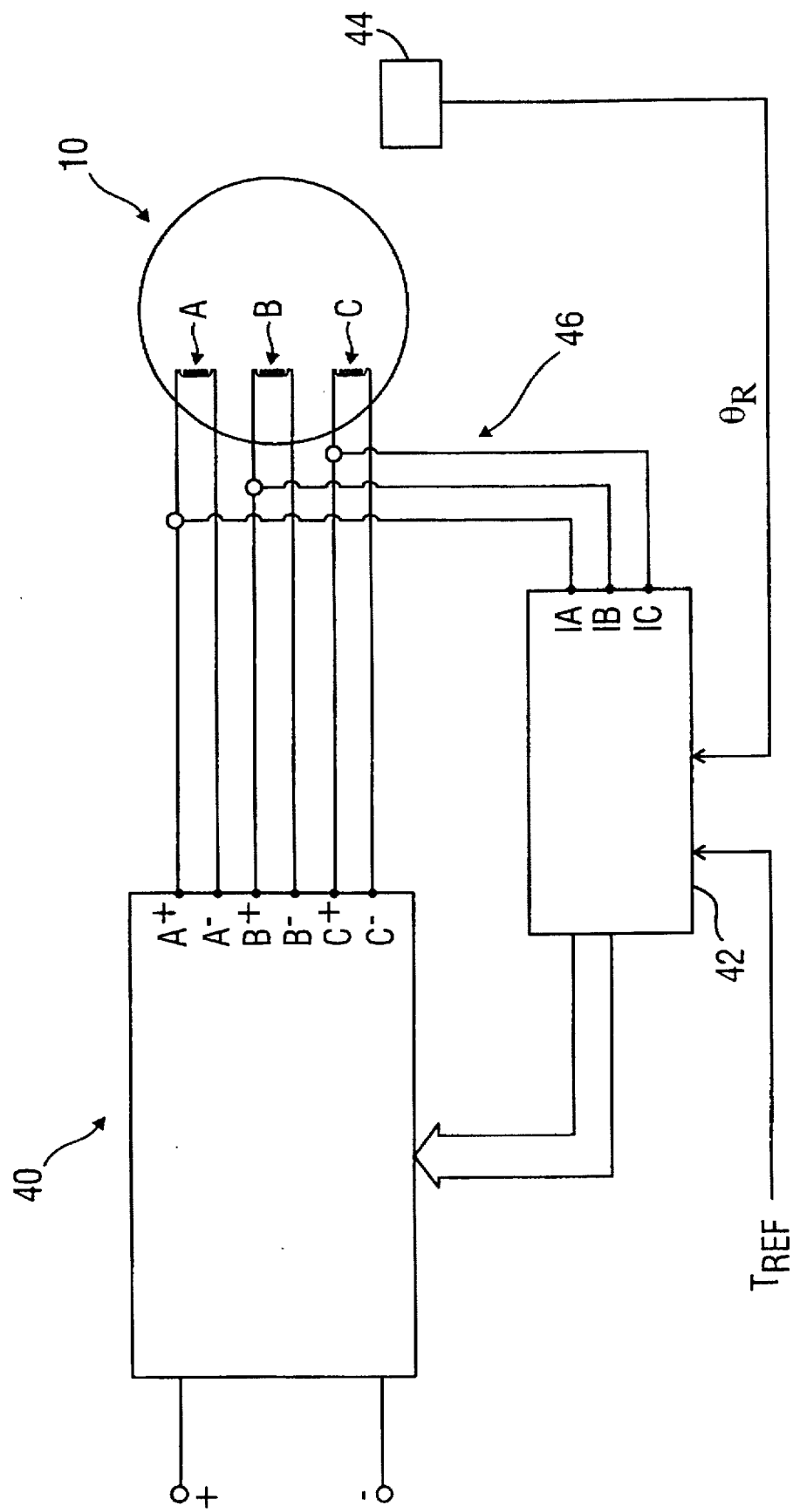
FIG. 4 illustrates a reluctance machine system in accordance with the present invention.

Turning to the drawings and, in particular FIG. 4, a reluctance machine system is disclosed comprising a fully-pitched reluctance machine 10, which may be of the type illustrated in FIG. 1, a novel drive circuit 40, and a current controller 42 that provides control signals to power switching devices that comprise the drive circuit 40. The three fully-pitched phase windings A, B and C of the reluctance machine 10 are coupled to the outputs of the drive 40, and the drive 40 energizes the phase windings in response to switching signals provided by the current controller 42. The current controller generates the switching signals in response to rotor position signals provided by a rotor position transducer 44 and in response to current feedback signals 46 that reflect the magnitude of the currents in the phase windings.

The machine 10 may be constructed using known techniques. Any suitable rotor position transducer 44, such as an optical or magnetic transducer, may be used. Current sensors, or current measuring sense resistors may be used to generate the current feedback signals 46.

Figure 5A:
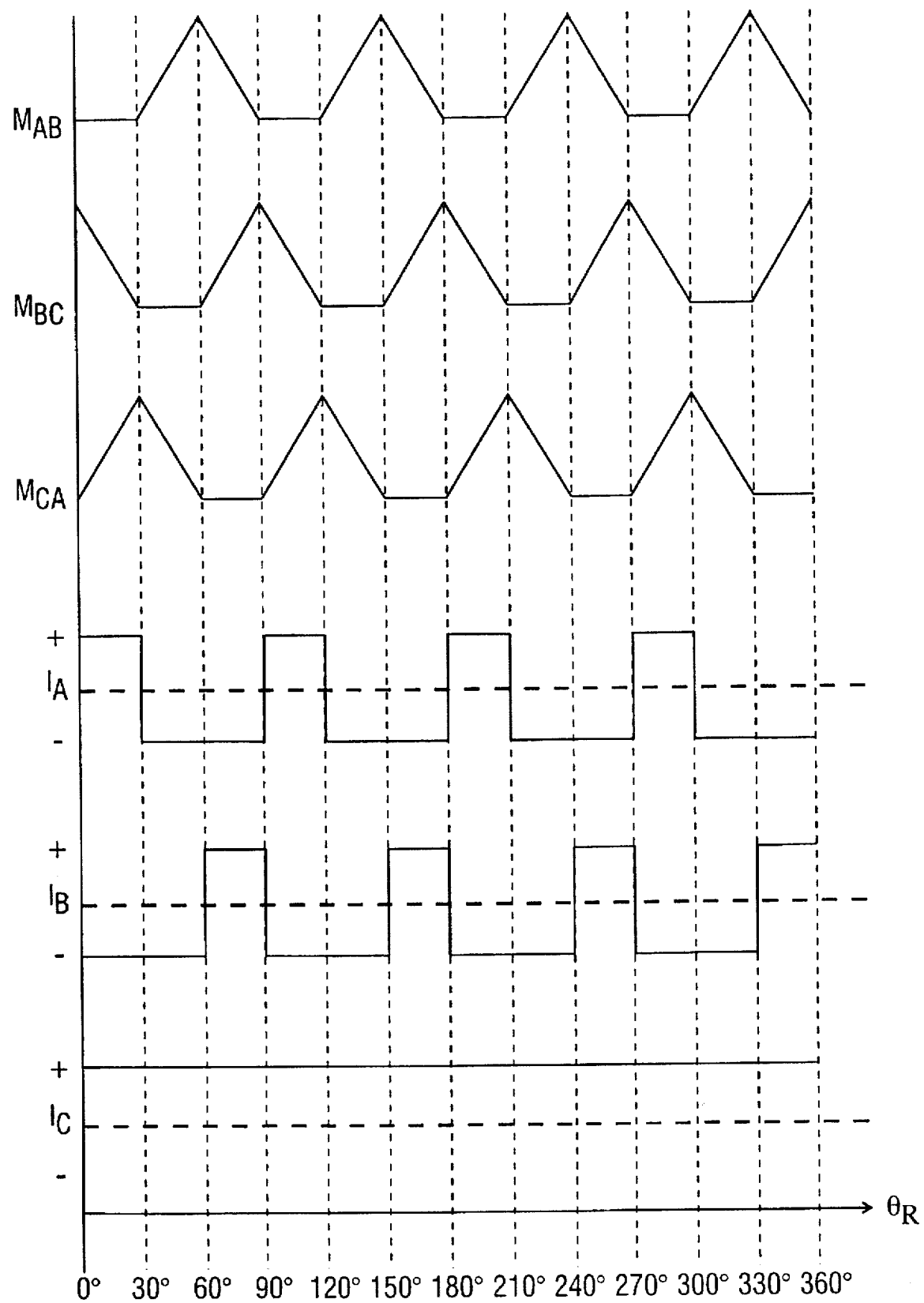
FIG. 5A illustrates the novel energization scheme implemented by the drive circuit of FIG. 4.
Figure 5B:
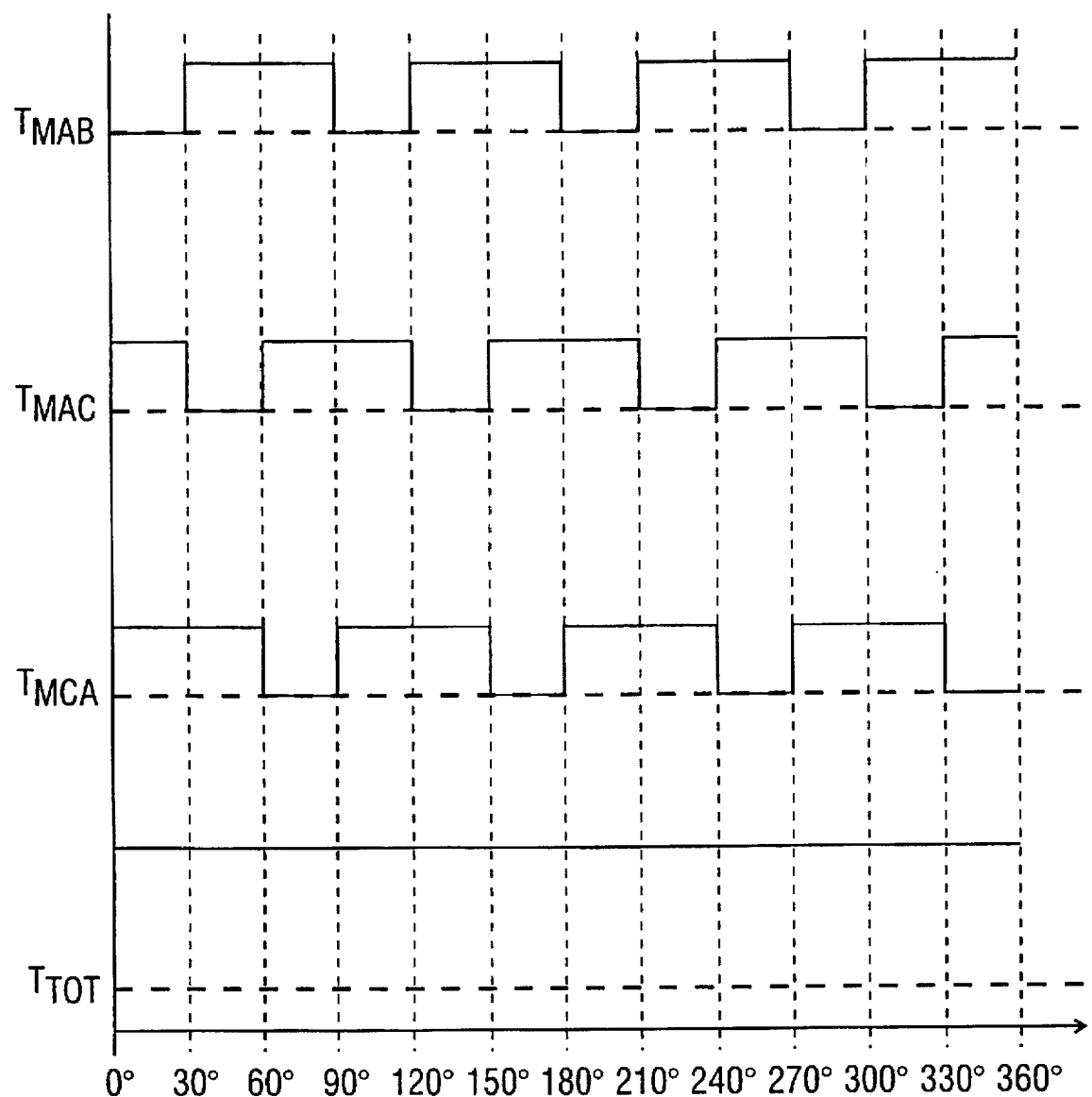
FIG. 5B illustrates the total and per-mutual-inductance torque contributions for the machine 10 of FIG. 4 as energized according to the energization scheme of FIG. 5A.

FIG. 5A illustrates the novel energization scheme implemented by drive 40. Specifically FIG. 5B illustrates the idealized mutual inductances between the three phase windings as a function of the angular position of the rotor. FIG. 5B also illustrates the phase currents $I_A$, $I_B$ and $I_C$ established in the three phase windings A, B and C of machine 10 by drive 40. As may be noted from a review for the phase currents, the energization scheme reflected in FIG. 5A is a "three-phase" scheme in that at any given rotor position current is flowing in three windings simultaneously. However, in the energization scheme of FIG. 5A, only the currents in two of the phase windings, phases A and B, are bi-polar. The current established in phase winding C is uni-polar.

It may be noted that the energization currents for the phase A and B windings in the energization scheme illustrated in FIG. 5A are such that the current in the phase A and B windings is of the same polarity as the current in the phase C winding when the mutual inductance between the respective phase windings and the phase C winding is increasing. Thus, during these intervals, because the mutual inductance between the respective phase windings and the phase C winding is increasing and the currents in the respective winding and the phase C winding are of the same polarity, a positive torque contribution is made.

Alternately, the energization currents used in the scheme of FIG. 5A are such that the current in the phase A and B windings is of the opposite polarity as the current in the phase C winding when the mutual inductance between the respective phase windings and the phase C winding is decreasing. Thus, during these intervals, because the mutual inductance between the respective phase windings and the phase C winding is decreasing and the currents in the respective winding and the phase C winding are of the opposite polarity, a positive torque contribution is made.

As further illustrated in FIG. 5A, the currents in the phase A and B windings remain of a polarity opposite that of the polarity of the current in the phase at all times other than when the mutual inductance between the respective windings and the phase C winding is increasing. Accordingly, the currents in the phase A and phase B windings are of the same polarity as the current established in the phase C winding for a first interval of rotor rotation and of the opposite polarity for a second interval of rotor rotation where the second interval is twice that of the first interval. In the example of FIG. 5A, the first interval corresponds to 60° electrical of rotor rotation and the second interval corresponds to 120° electrical of rotor rotation., where the each electrical degree =P/2 * one mechanical degree, where P is the number of rotor poles.

As reflected in FIG. 5A, the energization currents for the phase A and phase B windings are of the same form but are phase shifted with respect one another by a given amount, which the illustrated 6 stator pole/4 rotor pole (6/4) machine example is 30° mechanical or 60° electrical. For a N.(6/4) machine, where N is an integer, the phase shift will be 30°/N mechanical or 60° electrical.

Figure 2A:
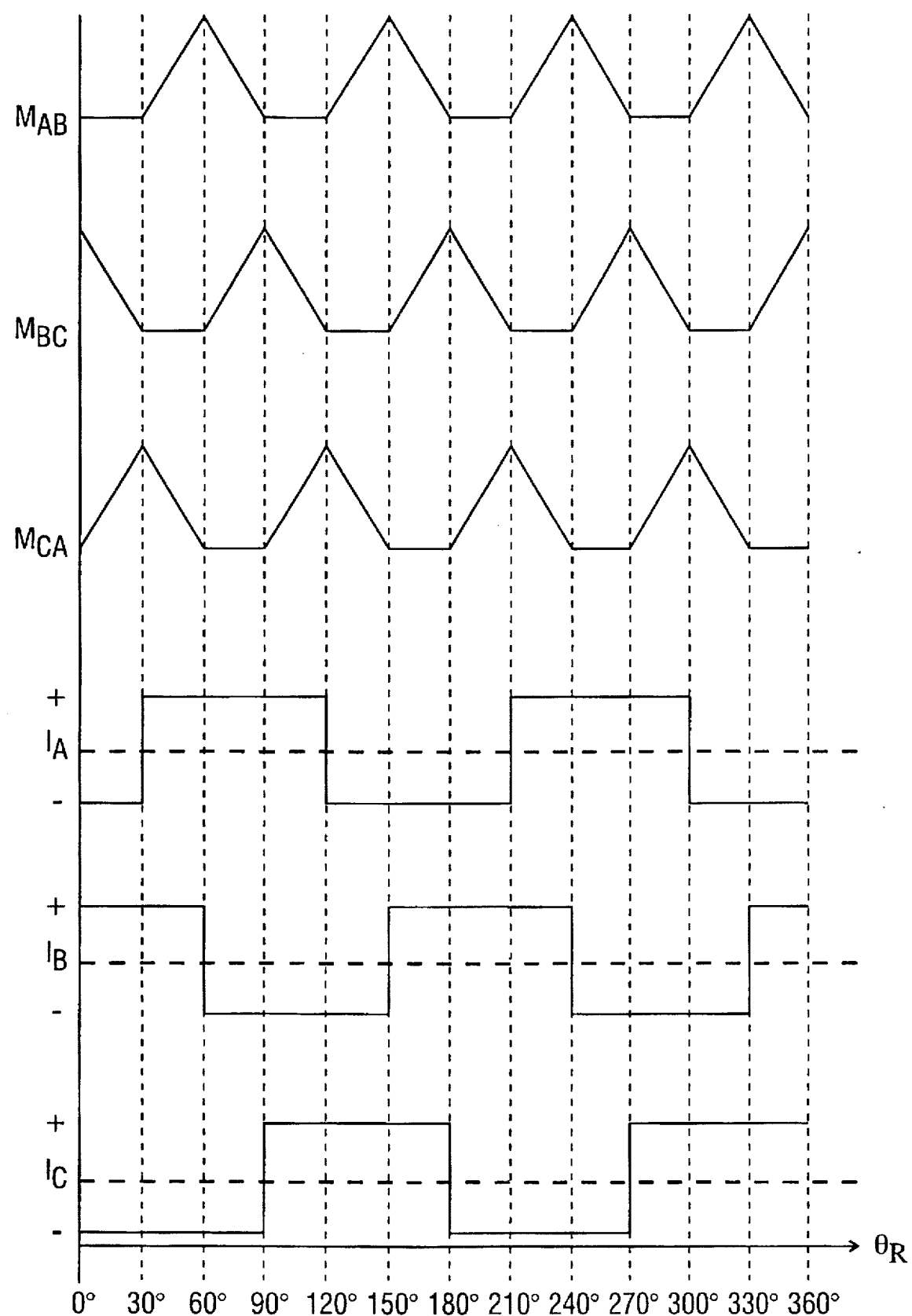
FIG. 2A illustrates a standard three-phase bi-polar energization scheme for energizing the reluctance machine of FIG. 1.
Figure 2B:
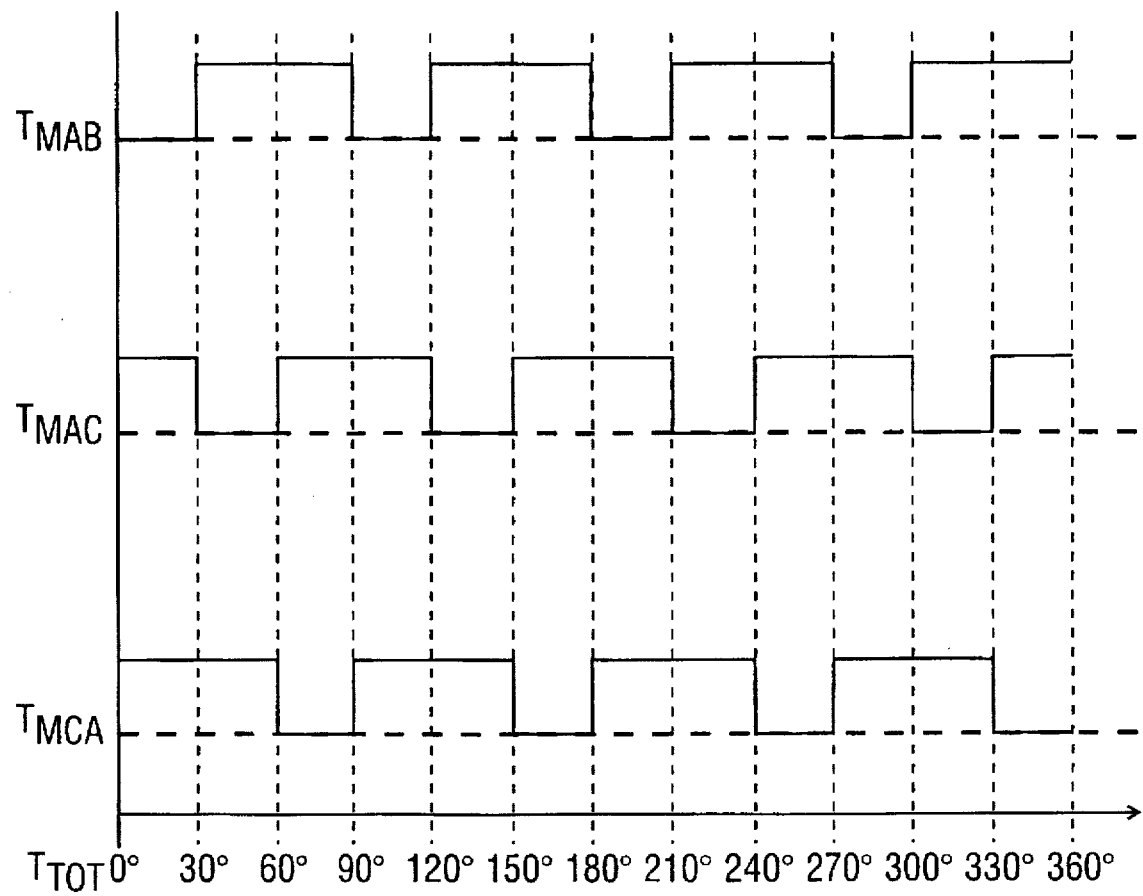
FIG. 2B illustrates the total and per-mutual-inductance torque contributions for the machine of FIG. 1 as energized according to the energization scheme of FIG. 2A.

FIG. 5B illustrates the torque output contribution for each of the mutual inductances set forth in FIG. 5A and the total torque output of the machine 10 as energized according to the energization scheme of FIG. 5A. As a comparison of the total torque output in FIG. 5B with the total torque output for the energization scheme of FIG. 2A as reflected in FIG. 2B indicates, the energization scheme of FIG. 5A provides the same torque output of that of FIG. 2A. This is significant because the drive required to implement the energization scheme for FIG. 5A is far simpler and more economical that that required to implement the energization scheme of FIG. 2A. Thus, the energization scheme of the present invention allows a fully-pitched reluctance motor system to provide the same torque output in a less complex and less costly manner.

Figure 3:
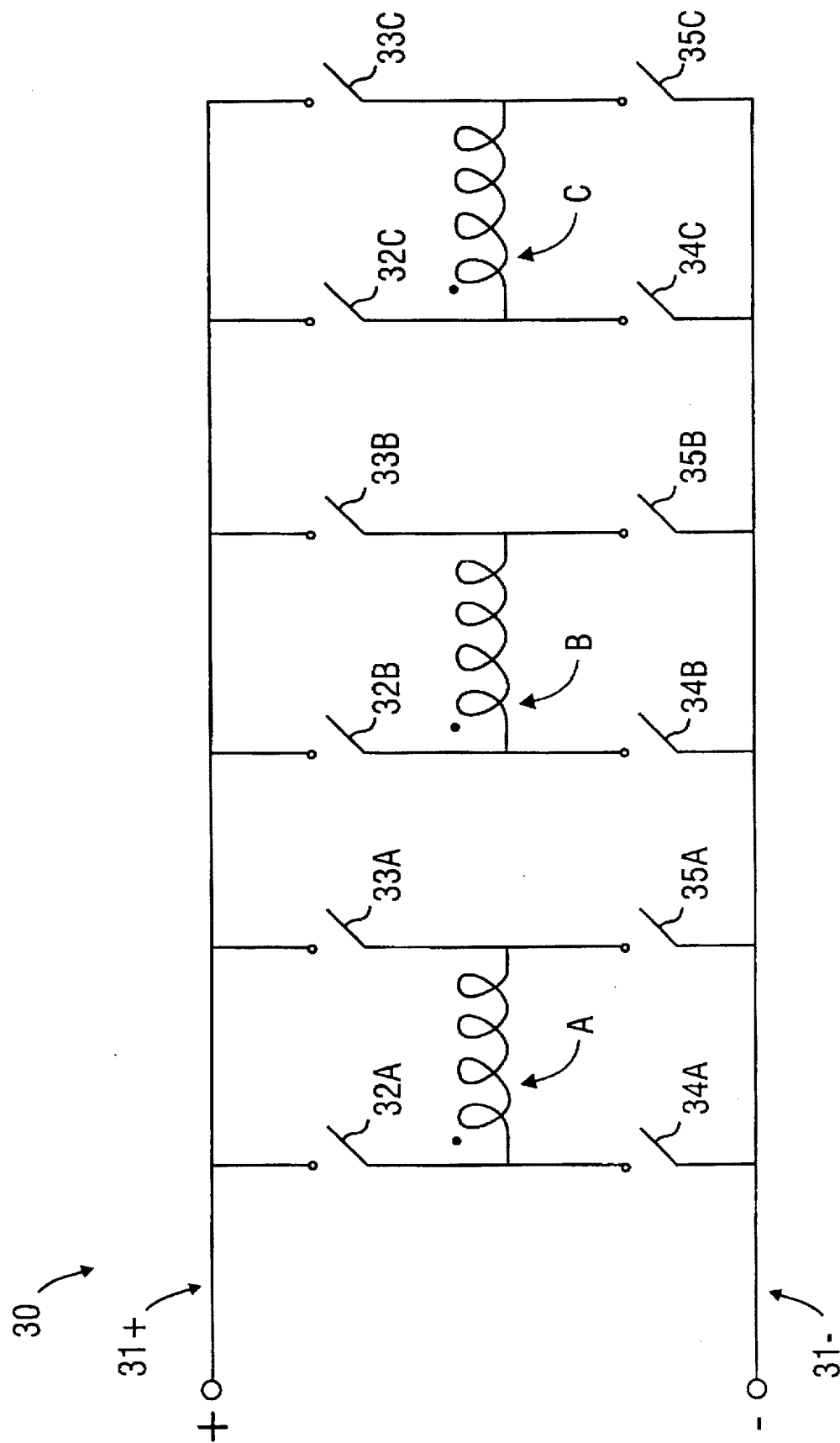
FIG. 3 illustrates a standard three-phase H-bridge drive for implementing the energization scheme of FIG. 2A.

Because the phase C current in the energization scheme of FIG. 5A is uni-polar, drive 40 can be constructed in a more simplified fashion that that of the full H-bridge drive illustrated in FIG. 3. One suitable drive 40 for implementing the energization scheme of FIG. 5A is illustrated in FIG. 6.

Figure 6:
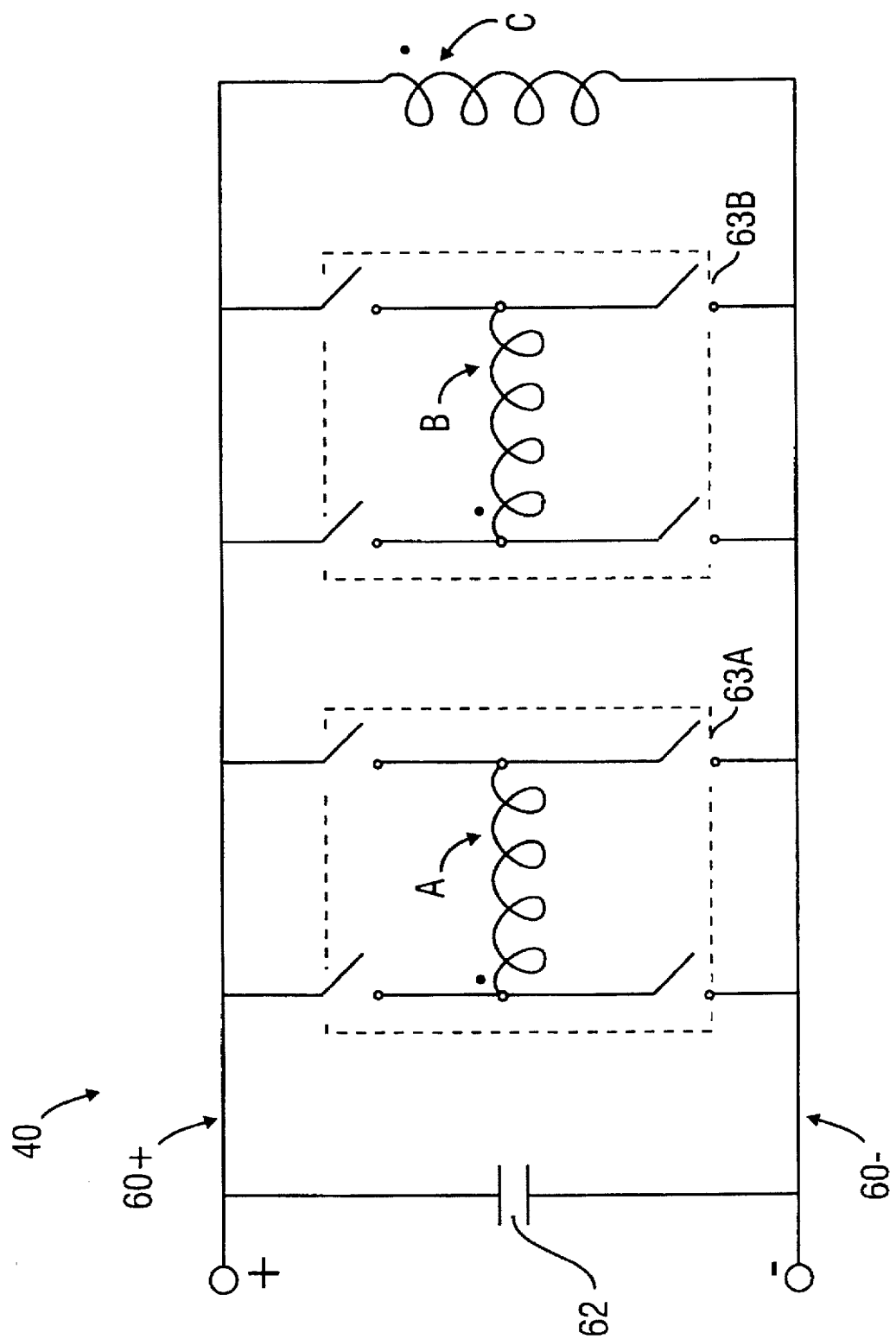
FIG. 6 illustrates an exemplary drive for implementing the energization scheme of FIG. 5A.

Turning to FIG. 6, the drive 40 comprises a DC bus having a positive rail 60+ and a negative rail 60–. A DC bus capacitor 62, or other regulating device, may be coupled across the DC bus to stabilize the DC voltage appearing across the bus and to absorb power placed on the bus. Because the currents that must be establishing in phase windings A and B are bipolar, standard H-bridge arrangements 63A and 63B are provided for each of those phase windings. The four power switching devices comprising the two H-bridge arrangements 63A and 63B may be MOSFETs, power MOSFETs, BJTs, IGBTs, mechanical devices or any other suitable power switching devices.

The phase winding C is directly coupled across the DC bus 60 such that, when DC power is applied to the bus 10, continuous, uni-polar DC current will be established in phase winding C. The magnitude of that current may be controlled by adjusting the magnitude of the DC bus voltage or the inductance of the phase C winding.

As those of ordinary skill in the art having the benefit of this disclosure will appreciate, the energization scheme of FIG. 5A may be implemented with the drive 40 of FIG. 6 by having the current controller 42 monitor the angular position of the rotor and generate appropriate drive signals for the H-bridges 63A and 63B to establish the appropriate phase currents in windings A and B. Because the switching scheme required for such energization is essentially a "two-phase" scheme (i.e., commutation occurs only with respect to two of the phase windings) the rotor position transducer circuitry and the control circuitry 42 made of a simpler construction than required for three phase energization schemes.

As a comparison of the drive 40 of FIG. 6 with the full H-bridge drive 30 of FIG. 3 indicates, the drive 40 requires four fewer power switching devices. Specifically, the drive 40 of FIG. 6 requires one less H-bridge switching arrangement. The drive 30 of FIG. 3 requires one H-bridge switching arrangement for each phase winding. In drive 40, there the number of switching arrangements is one less than the number of phase windings. As such, the cost of drive 40 will be less than that of the drive of FIG. 3. Moreover, because there is no switching that occurs with respect to phase winding C, the total switching losses associated with drive 40 may be less than those associated with the drive 30 of FIG. 3. Further, because there is no commutation of the phase C current, the total phase current waveform factor for the machine 10 when energized in accordance with FIG. 5A is better that previously available, thus providing a potential for improved torque density.

The drive 40 of FIG. 6 does not allow for direct control of the magnitude of the uni-polar current in the phase C winding. Embodiments are envisioned where such current control is desirable. An alternate drive 40' that allows for control of the magnitude of the uni-polar current in phase C is illustrated in FIG. 7.

Figure 7:
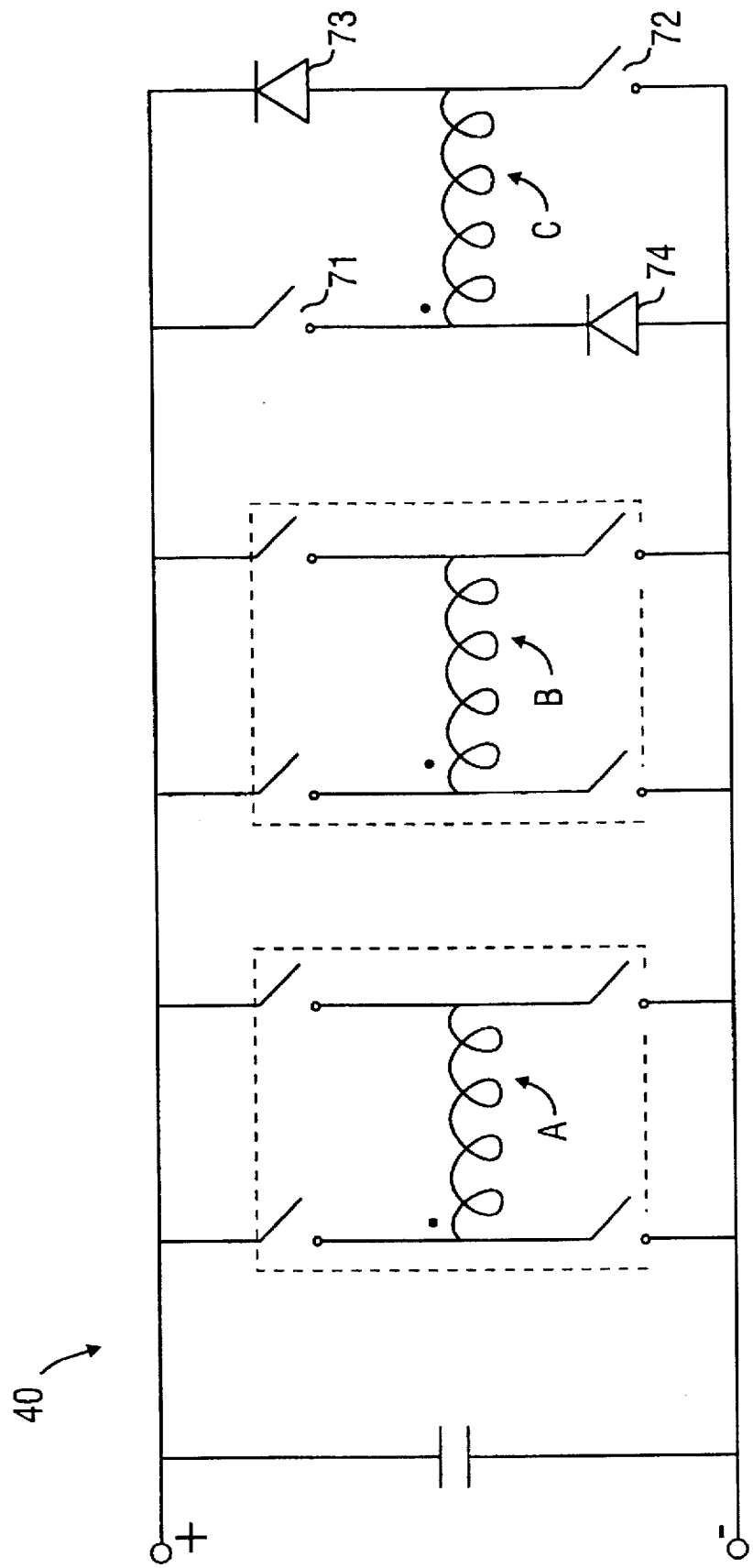
FIG. 7 illustrates an alternate exemplary drive for implementing the energization scheme of FIG. 5A.

Referring to FIG. 7, the drive 40' is similar to that of drive 4 of FIG. 6 in that it has a DC bus, a bus capacitor and two H-bridge arrangements associated with the phase A and the phase B windings. In the drive 40', however, a half-bridge, comprising two power switching devices 71 and 72 and two flyback diodes 73 and 74, is provided for the phase C winding. As those of ordinary skill in the art will appreciate, the half-bridge associated with the phase C winding allows for uni-polar current control to be accomplished in the phase C winding according to known methods. Because the cost of diodes is typically much less than that for power-switching devices, the drive 40' is more economical to manufacture than the full H-bridge drive 30 of FIG. 3.

When either of the drives 40 or 40' are used in the system of FIG. 4, the current controller 42 may receive a desired torque input command, produce a desired phase current command, and compare that with the current feed back signals 46 to produce a torque error signal. The torque error signal may then be used to modulate the gating signals applied to the drive 40 or 40' to control the magnitude of the current in the phase windings according to known methods.

Although not illustrated in FIGS. 6 or 7, embodiments are envisioned wherein only a single power switching device and a single fly-back diode are coupled to the phase C winding and used to control the magnitude of the uni-polar current in the phase winding.

The above description of several exemplary embodiments is made by way of example and not for purposes of limitation. Many variations may be made to the embodiments and methods disclosed herein without departing from the scope and spirit of the present invention. For example, the present invention was discussed in the context of a six stator pole four rotor pole machine. Alternate stator pole/rotor pole combinations (e.g., 12/8, 8/4) are envisioned, and the use of such alternate configurations will depart from the scope of the present invention. The present invention is intended to be limited only by the scope and spirit of the following claims.

I claim as my invention:

1. A reluctance machine system comprising:
   a reluctance machine including a rotor and a stator, the stator having a plurality of fully-pitched phase windings; and
   a drive coupled to the fully-pitched phase windings, wherein the drive energizes a first one of the phase windings such that the current established in the phase winding is substantially continuous and uni-polar regardless of the angular position of the rotor.

2. The system of claim 1 wherein the drive energizes the phase windings other than the first one phase winding such that bi-polar phase currents are established in the other phase windings during normal operation of the machine.

3. The system of claim 1 wherein the stator defines N.6 stator poles, the rotor defines N.4 rotor poles, where N is an integer equal to or greater than 1, and there are first, second and third fully-pitched phase windings.

4. The system of claim 3 wherein the drive energizes the first phase winding such that continuous uni-polar current flows in the first phase winding for all rotor positions and energizes the other two phase windings with bi-polar current.

5. The system of claim 4 wherein the drive energizes the second phase winding such that the current established by the drive in the second phase winding is of the same polarity as the current established in the first phase winding for a first interval of rotor rotation and of the opposite polarity for a second interval of rotor rotation where the second interval is twice that of the first interval.

6. The system of claim 5 wherein the current established in the third phase winding is of the same form as the current established in the second phase winding, but out of phase with the current in the second phase winding by a given angular amount.

7. The system of claim 6 wherein the given amount corresponds to 30° mechanical of rotor rotation.

8. The system of claim 1 wherein the drive comprises:
   a DC bus, wherein the first one of the phase windings is coupled across the DC bus such that uni-polar current is established in the first one of the phase windings when power is applied to the DC bus; and
   a plurality of H-bridge arrangements coupling the other phase windings across the DC bus such that bi-polar currents can be established in the other phase windings.

9. The system of claim 1 wherein the drive comprises:
   a DC bus;
   a half-bridge arrangement coupling the first one of the phase windings across the DC bus such that uni-polar current can be established in the first one of the phase windings; and
   a plurality of H-bridge arrangements coupling the other phase windings across the DC bus such that bi-polar currents can be established in the other phase windings.

10. A switched reluctance machine system comprising:
    a reluctance machine having a plurality of fully-pitched windings;
    a DC bus, wherein a first of the plurality of fully-pitched windings is coupled across the DC bus such that continuous, uni-polar current is established in the first fully-pitched winding when power is applied to the DC bus; and
    at least one switching arrangement coupling one other fully-pitched winding across the DC bus such that bi-polar current can be established in the other winding depending on the conduction state of the switching arrangement.

11. The system of claim 10 wherein the first fully-pitched winding is coupled directly across the DC bus.

12. The system of claim 10 wherein the first fully-pitched winding is coupled across the DC bus by a half-bridge switching arrangement comprising two power switching devices and two diodes.

13. The system of claim 10 wherein the switching arrangement comprises a full H-bridge having first, second, third and fourth power switching devices.

14. The system of claim 10 further including a current controller for receiving an indication of the angular position of the rotor with respect to the stator and adjusting the conduction states of the switching arrangements to control the current in the other fully-pitched windings.

15. The system of claim 10 wherein the drive energizes each of the other phase windings such that the current in each of the other phase windings is of the same polarity as the current in the first fully-pitched phase winding when the mutual inductance between each of the other phase windings and the first fully-pitched winding is increasing.

16. The system of claim 10 wherein the drive energizes each of the other phase windings such that the current in each of the other phase windings is of the opposite polarity as the current in the first fully-pitched phase winding when the mutual inductance between each of the other phase windings and the first fully-pitched winding is decreasing.

17. A method of operating a reluctance machine having a plurality of fully-pitched phase windings, the method comprising the steps of:
    energizing a first of the fully-pitched winding such that continuous, uni-directional current flows in the phase winding during normal machine operation;
    energizing each of the other fully-pitched windings such that the current in each of the other phase windings is of the same polarity as the current in the first fully-pitched winding when the mutual inductance between the other phase winding and the first fully-pitched winding is increasing.

18. The method of claim 17 further comprising the step of energizing the other fully-pitched windings such that the current in the each of the other phase windings is of the opposite polarity as the current in the first fully-pitched winding when the mutual inductance between the other phase winding and the first fully-pitched winding is decreasing.

19. The method of claim 17 further comprising the step of energizing each of the other fully-pitched windings such that the current in the other phase winding is of the opposite polarity as the current in the first fully-pitched winding at all times other than when the mutual inductance between the other phase winding and the first fully-pitched winding is increasing.

20. The method of claim 17 further comprising the step of energizing each of the other phase windings such that the current in each of the other phase windings is of the same polarity as the current established in the first fully-pitched winding during a first interval of rotor rotation and of the opposite polarity during a second interval of rotor rotation, where the second interval is greater than the first.

21. The method of claim 20 wherein the first interval corresponds to 60° electrical of rotor rotation and wherein the second interval corresponds to 120° electrical of rotor rotation.

22. A reluctance machine system comprising:
    a reluctance machine having a plurality of fully-pitched phase windings; and
    a drive electrically coupled to the phase windings, the drive including a plurality of switching arrangements, wherein each switching arrangement is adapted to provide bi-polar current to one of the fully-pitched phase windings and wherein the number of switching arrangements is less than the number of fully-pitched phase windings.

23. The system of claim 22 wherein each switching arrangement comprises a full H-bridge.

24. The system of claim 22 wherein the number of switching arrangements is one less than the number of phase windings.

* * * * *